United States Patent [19]

Davidson

[11] Patent Number: 4,606,558
[45] Date of Patent: Aug. 19, 1986

[54] PLASTIC PIPE FITTING

[76] Inventor: John H. C. Davidson, 226 Leopard Cir., Waynesville, N.C. 28786

[21] Appl. No.: 578,889

[22] Filed: Feb. 10, 1984

[51] Int. Cl.$^4$ ............................................. F16L 13/10
[52] U.S. Cl. ....................................... 285/21; 285/197; 285/423; 285/915; 156/60; 81/176.1
[58] Field of Search ....... 285/197, 198, 199, DIG. 16, 285/21, 423

[56] References Cited

U.S. PATENT DOCUMENTS

| | | | |
|---|---|---|---|
| 344,760 | 6/1886 | Wilbur | 285/DIG. 16 X |
| 351,397 | 10/1886 | Payne | 285/197 X |
| 1,558,503 | 10/1925 | Pressler | 285/DIG. 16 X |
| 3,188,121 | 6/1965 | Cude et al. | 285/197 |
| 3,272,534 | 9/1966 | Smith | 285/197 X |
| 3,315,989 | 4/1967 | Ohnstad . | |
| 3,364,939 | 1/1968 | Valenziang . | |
| 3,649,055 | 3/1972 | Nilsen . | |
| 3,694,009 | 9/1972 | Phillips . | |
| 3,762,743 | 10/1973 | Hawle . | |
| 3,779,272 | 12/1973 | Dunmire . | |
| 3,863,937 | 2/1975 | Silverman et al. . | |
| 3,891,247 | 6/1975 | Smith . | |
| 3,954,541 | 5/1976 | Landgraf | 285/197 X |
| 3,999,785 | 12/1976 | Blakeley . | |
| 4,059,292 | 11/1977 | Acda et al. | 285/197 |
| 4,135,258 | 1/1979 | Braga et al. . | |
| 4,158,461 | 6/1979 | Francis . | |
| 4,168,089 | 9/1979 | Hulslander et al. . | |
| 4,258,742 | 3/1981 | Louthan et al. . | |
| 4,258,941 | 3/1981 | Sands . | |
| 4,273,364 | 6/1981 | De Lange . | |

FOREIGN PATENT DOCUMENTS

| | | | |
|---|---|---|---|
| 2707492 | 8/1978 | Fed. Rep. of Germany | 285/DIG. 16 |
| 968700 | 12/1950 | France | 285/197 |
| 757430 | 9/1956 | United Kingdom | 285/197 |

Primary Examiner—Thomas F. Callaghan
Attorney, Agent, or Firm—Brumbaugh, Graves, Donohue & Raymond

[57] ABSTRACT

A plastic pipe fitting includes a mounting section to be secured to a main pipe and a stem and a collar for receiving an end of a branch pipe. Flexible arms extend partially around the main pipe diverging from the outside surface of that pipe. The fitting is bonded to the main pipe by plastic plumbing solvent. Projections at the ends of the fitting's arms facilitate clamping tightly against the main pipe and receive connectors of a special clamping tool. The pipe includes a first connector, and an elastic member connected to the first connector and extending to a lever. The lever ends in a second connector and has a handle for pivoting the lever. Pivoting the lever with the two connectors in place flexes the arms inward and forces all contacting surfaces of the fitting and pipe into extremely high pressure contact for bonding. Once fitting and main pipe are bonded, the clamping tool is removed, a hole saw directed through the stem opens a hole into the main pipe. Perforations through the fitting's mounting section permit air escape and allow solvent and dissolved plastic to ooze through the holes. It includes a groove and compressible ring in the groove, but projecting slightly. Clearance between the groove and ring retains solvent when applied to the fitting surface. When the fitting is clamped against the pipe, the ring bulges, fills the clearance, and emits the retained solvent.

11 Claims, 8 Drawing Figures

PLASTIC PIPE FITTING

BACKGROUND OF THE INVENTION

The invention relates to a pipe fitting for connecting a first or branch pipe to a second or main pipe and to a method for connecting the first pipe to the second pipe by adhesively securing the fitting in place. More particularly, the invention concerns a T fitting having a saddle that is bonded to a main plastic pipe and then connected to a branch plastic pipe, thereby joining the pipes.

A T fitting is typically used to connect a first pipe, called herein the branch pipe, to a second or main pipe that continues past the point of connection. Ordinarily, the branch pipe has a smaller diameter and the fitting is referred to as a reduction T. For example, a horizontal water or sewage pipe often is connected into a larger vertical pipe, or "riser". With conventional T's, to join the pipes, the riser must be cut. If the riser is already installed, it must be cut twice in order to remove a section and make room for the reduction T. To assure a leakproof fit, the cuts should be substantially perpendicular to the longitudinal axis of the pipe and the ends formed by these cuts should extend well into enlarged collars on the fitting. Cutting an installed pipe is often very difficult due to the awkward location of the pipe, inside a wall, floor, a ceiling. Once an installed pipe is cut, the newly formed ends of the pipe must be bent away from each other to allow them to slip into the T fitting. Little or no axial movement of the ends is ordinarily possible.

Even in new construction, using conventional fittings, the exact floor-to-floor length of riser must be cut. The riser is installed, the fitting is located so that the branch pipe connection appears to extend in the correct direction, the next length of riser is fitted into the fitting and this process is repeated from floor to floor. This is time consuming and expensive. Moreover, once facilities have been completed, it can be found that the conventional T fitting is not appropriately directed and this "roughed-in" plumbing then must be pulled apart and reassembled properly, adding further to the time and expense.

To overcome some of the problems associated with conventional T fittings, somewhat different fittings have been suggested for use with plastic pipes. Several have stems to receive a branch pipe and mounting sections that clamp permanently about the main pipe. At least one proposed fitting for a plastic pipe has arms forming a saddle partially embracing a pipe into which an opening is to be made and to which another branch pipe is to be secured. This fitting is affixed to the plastic pipe by applying a fluid adhesive or solvent type bonding liquid. The solvent cures and bonds the fitting to the pipe. A hole is then drilled into the pipe through the fitting's central opening, and the branch pipe is connected.

The bonded in place fitting just described has a saddle inner diameter equal to the outside diameter of the pipe on which they are to be mounted. Arms extend more than 180° around the perimeter of the pipe. The ends of these arms are spaced apart a distance less than the pipe O.D. Consequently, as such a fitting is located on the main pipe, the ends resiliently engage the pipe and slide into place. These arms can scrape a good portion of the solvent off of the pipe while the pipe wipes solvent from the sliding arm surfaces. An inadequate supply of solvent between the arms and the pipe can be the result. Only the resilience of the arms partially embracing the main pipe holds the fitting in place during setting of the adhesive and when the inside of the fitting and the outside of the pipe are brought together, pockets of air may be trapped between the surfaces of the fitting and the pipe resulting in unbonded areas. Manual coating of the pipe and fitting with adhesive very often can result in little or no adhesive at some point. Less than complete bonding of the contacting parts raises the possibility of leakage.

Prior suggestions for bonded-in-place fittings overlook the typical out-of-round condition of extruded pipe. While molded fittings with surfaces designed to fit the O.D. of a main pipe may have perfectly cylindrical surfaces for this purpose, extrusion of plastic pipe does not result in precision cylindrical outer pipe surfaces. The fitting and pipe surfaces therefor, can be expected to be far less than a perfect match. This also increases the likelihood of inadequate bonding. Extremely high bonding forces between the fitting and the pipe can overcome failure of the surfaces to properly mate, but such forces will not be provided by the snapped into place fitting in which only the resilience of the arms embracing the pipe hold the fitting in place.

Accordingly, a need exists for T fitting that overcomes not only the problems associated with conventional T fittings, but also the problems arising from the use of known bonded-in-place fittings for plastic pipes. More specifically, a T fitting is desirable that is simply and inexpensively manufactured and easily but securely attached.

SUMMARY OF THE INVENTION

In accordance with this invention there is provided a pipe fitting having a saddle or mounting section to be bonded in place to a main pipe, a projecting central connecting section to receive the branch pipe, and several means to assure strong, leak-proof bonding of the saddle and the main pipe by means of solvent type bonding agent. In the method of joining pipes using the improved fittings, the fitting is located on the main pipe without wiping away solvent and the fitting and main pipe are clamped temporarily but very firmly together as the solvent and dissolved plastic sets.

The saddle or mounting portion includes a central portion that has an inner diameter substantially equal to the outer diameter of the first pipe. A pair of flexible arms extend from the central portion and diverge outward from the curvature of the surface of the intended main pipe. Because the arms diverge from the main pipe surface, solvent is not scraped from the pipe or wiped from the under surfaces of the arms as the pipe and saddle are brought into contact.

Perforations in the saddle permit air to escape from between the saddle and the main pipe to further assure good, continuous bonding throughout contacting areas. Additionally, the bonding solvent and dissolved plastic oozes through the perforation to form small, rivet-like projections bonded within the perforations and on the exterior surface mechanically securing the fitting to the pipe.

To assure a copious supply of bonding agent surrounding the opening through the fitting and into the main pipe, the saddle includes, in its surface that contacts the main pipe, a groove encircling the opening and seating a compressible ring, such as, for example, a neoprene ring. Clearance between the walls of the groove and the ring create a space that draws into it a reserve of bonding agent. The ring projects slightly out of the groove. As the saddle is urged against the pipe, the ring compresses and fills the groove completely, thereby forcing the solvent that was in the space between the ring and the groove walls into the area between the pipe saddle and the pipe. This feature of the invention acts as a solvent pump permitting a larger amount of the solvent bonding agent to be applied to the mating surfaces of the saddle and the main pipe than would be certain to be applied merely by manually coating the engaging surfaces. This increased amount of solvent entirely encircles the opening. Excess solvent forced from the groove follows a path of least resistance to any solvent starved area to assure good bonding there.

Projections or clamping bosses at the ends of the arms permit temporary clamping of the fitting in place. An elongate elastic member is tightly secured from boss to boss around the main pipe by a pivotal over-center acting tool. Preferably the arms of the fitting extend only 180° or less around the main pipe to exert force on the fitting towards the pipe and assure a good surface-to-surface bond. The elastic member pulls the arm ends tightly against the main pipe while exerting extremely high bonding pressure by pulling the entire fitting towards the pipe. The saddle or mounting section is sufficiently flexible throughout to conform to the pipe surface under the high pressure developed, even if the pipe is not perfectly cylindrical. The high pressure developed between the fitting and main pipe and the flexibility of the mounting section of the fitting aid in the expulsion of air and excess solvent through the aforementioned perforations as well.

In one embodiment of the invention, the projecting stem of the fitting that connects to the branch pipe is integrally connected to the central portion of the saddle at an angle with respect to the axis of the main pipe to define a downwardly sloping opening into the main pipe similar to the slope provided in older conventional T's used for sewage connection. The bore of the stem is circular in cross-section, but provides a substantially elliptical opening at the surface of the mounting section where it joins the main pipe. Then, when the bore of the stem is used to guide a hole cutting saw through the wall of the main pipe this hole is elliptical as well. The elliptical opening into the main pipe enables a branch pipe and a main pipe of equal diameters to be joined while minimizing the decrease in effective flow area through the fitting.

The fitting in accordance with the present invention allows a branch pipe to be connected to an existing riser or other main pipe without prior cuts being made to accommodate the fitting, adequate bonding fluid in complete encircling relation to the opening into the main pipe is assured, air pockets are prevented, very high bonding pressure is assured during temporary clamping of the fitting in place, and wiping away of the fluid during location of the fitting is prevented.

The above and further advantages of the invention will be better understood with reference to the following detailed description of the preferred embodiments taken in conjunction with the attached drawings.

DETAILED DESCRIPTION OF THE PREFERRED EMBODIMENTS

Figure 1:
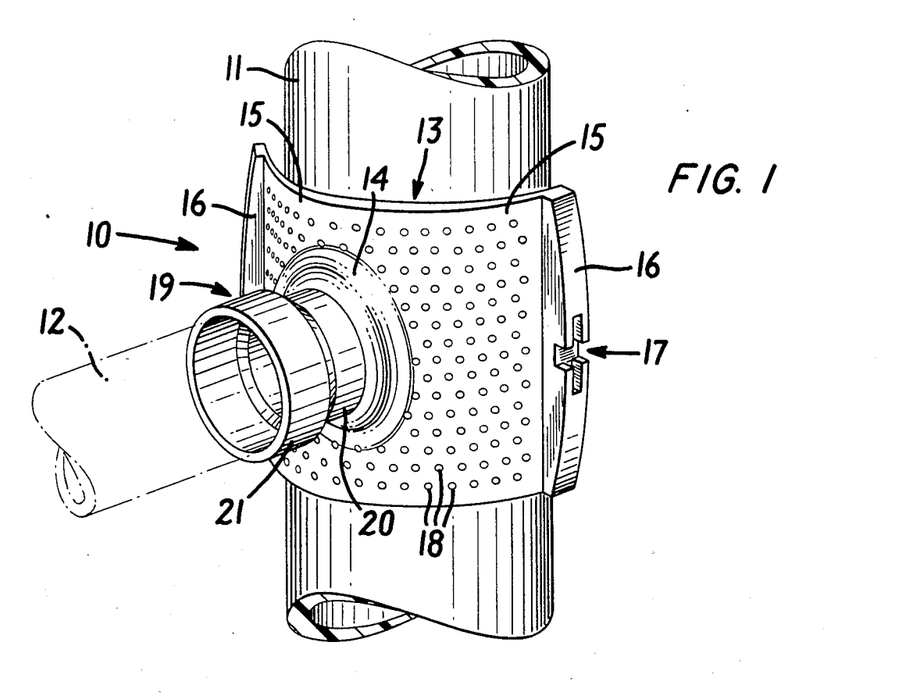
FIG. 1 is a perspective view of a fitting in accordance with the invention and shows the fitting adjacent to a main pipe on which it is to be mounted.

In FIG. 1, a pipe fitting 10 is adjacent a main pipe 11. The fitting and pipe are both of a plastic such as polyvinylchloride (PVC) in common use for pipes and plumbing fittings. The location that a branch pipe 12 is to occupy is shown in phantom. A flexible mounting section or saddle 13 of the fitting includes a central portion 14 and a pair of flexible arms 15. The under surface of the central portion 14 has a diameter that is substantially equal to the nominal outer diameter of the pipe 11. The arms 15 extend from the central portion 14 and diverge outward from the cylindrical surface of the pipe 11 as better seen in FIG. 2. Because the arms diverge from the curvature of the pipe, the arm ends are spaced from the pipe, and when the fitting 10 is placed against the pipe 11 in the presence of a solvent that serves to bond the two, the arms 15 do not scrape away the solvent on the pipe 11 nor is solvent on the under surface of the arms wiped towards the central portion 14 of the fitting as the fitting is located. The solvent referred to is the conventional bonding agent for plastic plumbing parts and is sold widely and by numerous manufacturers. The solvent temporarily dissolves the plastic at the surfaces of adjoining parts where it is spread. The dissolved plastic then quickly sets to become a substantially unified piece across the bond.

Figure 2:
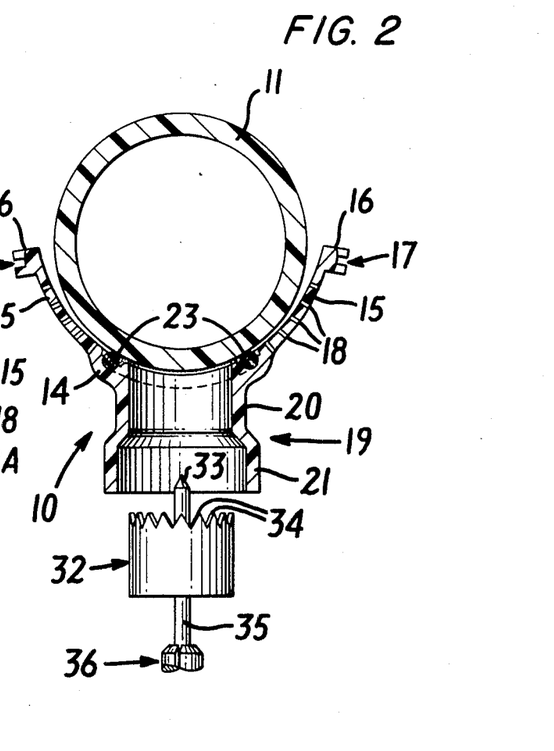
FIG. 2 is a cross-sectional view of the fitting of FIG. 1 showing the arms of a saddle portion thereof diverging from the outside diameter of the main pipe.

Preferably, as depicted in FIG. 2, the arms 15 are tapered towards their ends for increased flexibility. A clamping boss or projection 16 is located at the thinner end of each of the arms 15. Each boss 16 has a slot 17 to receive a connector or a tool (described below) for urging the arms tightly into contact with the pipe 11 during setting of the solvent. The arms 15 extend 180° around the pipe 11 and the bosses are approximately diametrically opposed.

Figure 2A:
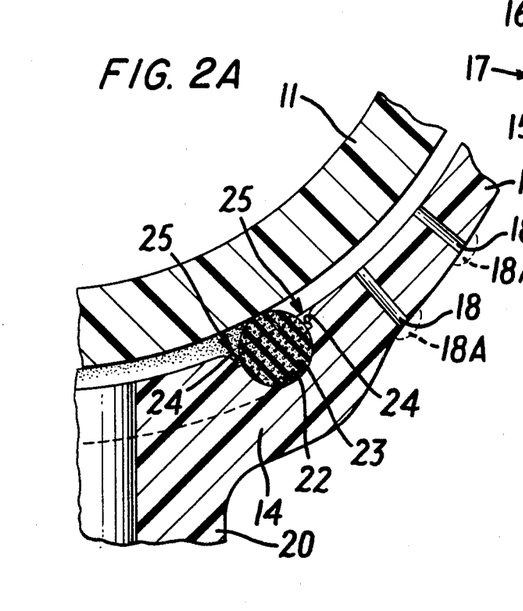
FIG. 2A is an enlarged fragmentary cross-sectional view of the pipe saddle shown in FIG. 2 and better illustrates a groove and a compressible ring located therein.

In the fitting 10 of FIGS. 1, 2 and 2A, perforations or holes 18 through either or, preferably, both of the central portion 14 and the arms 15 permit air to escape when the pipe saddle is placed against the pipe on which it is to be mounted and allow the dissolved plastic and solvent to flow from between the fitting and the pipe 11 to the outer surface of the saddle 13. When the dissolved plastic sets it forms rivet-like projections as indicated in broken lines at 18A in FIG. 2A. These are bonded to the interior of the perforations 18 and to the exterior of the mounting saddle, and they contribute to a secure connection.

The fitting 10 also includes a projecting stem section 19 similar to that on conventional reduction T's. A neck 20 connects at one end to the central portion 14 of the saddle, and at the other end to an enlarged collar 21 that receives the end of the branch pipe 12.

As shown in FIG. 2A, a groove 22 houses a compressible but nonabsorbent ring 23 of, e.g., neoprene. The ring may be adhesively or otherwise secured in the groove, if necessary. The deepest part of the groove is semi-circular in cross section. This receives the ring 23 in close-fitting association and may extend 180° or more around the ring's circular cross section. The upper part of the groove, i.e., the portion closest to the pipe 11, has surfaces 24 beveled or otherwise formed to depart slightly from the surface of the ring. The beveled surfaces of the groove 23 and the ring 24 define narrow spaces 25, which, by capillary action, draw into them and retain some of the solvent spread on the surface there. FIGS. 2 and 2A illustrate the pipe saddle 10 with the compressible ring 24 just touching the main pipe 11. The ring extends out of the groove slightly. As the pipe saddle is forced into place on the pipe 11, the compressible ring 24 fills the spaces 25 and displaces the solvent collected there. In this way, the groove 23 and the ring 24 act as a solvent pump that holds a supply of solvent in completely surrounding relation to the opening through the central portion 14 to the neck 20 before the saddle 13 is forced against the pipe 11 and then expels the solvent when the saddle 13 is forced tightly against the pipe. Thus, and adequate supply of solvent entirely surrounding the opening and good leak-proof bonding completely around the opening is assured.

Figure 3:
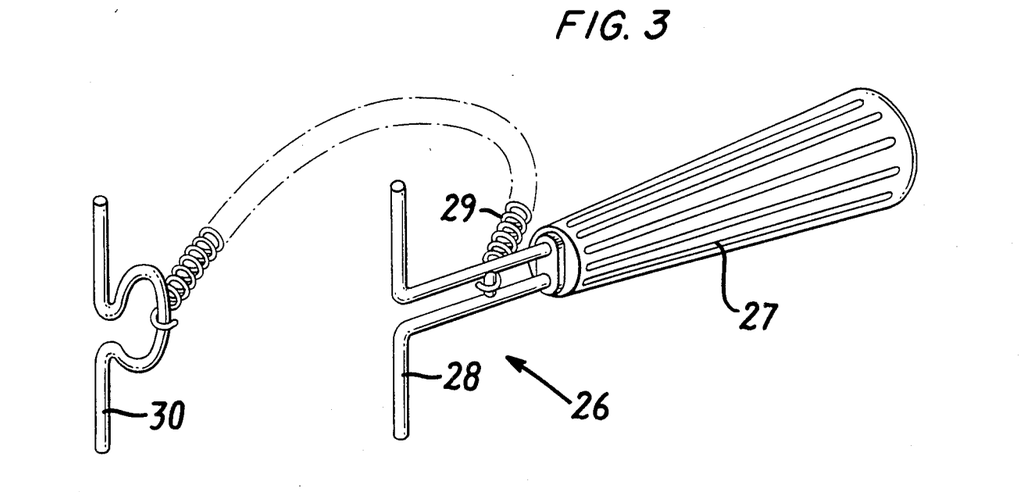
FIG. 3 is a perspective view of a tool for temporarily securing the fitting in place on the main pipe as solvent bonds the fitting and pipe.
Figure 4:
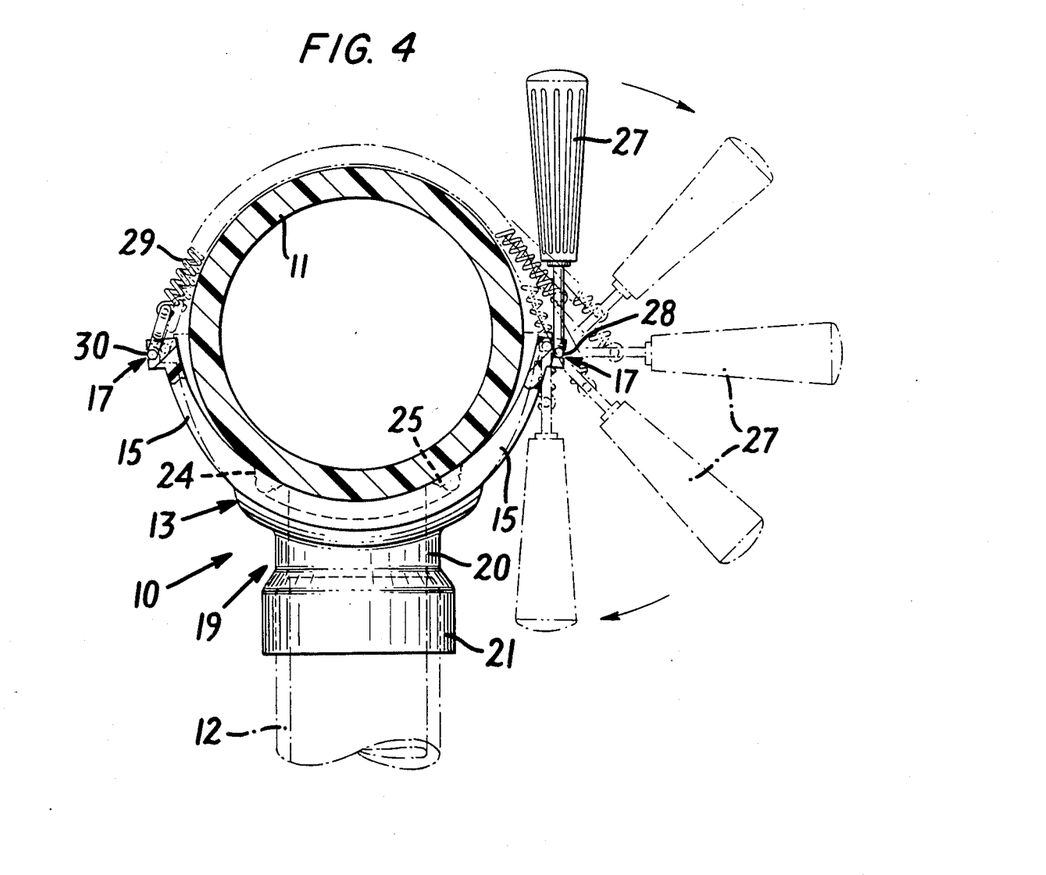
FIG. 4 is a top plan view of the fitting of FIG. 1 showing the main pipe in cross section and illustrating the operation of the temporary securing tool.

In FIG. 3, a clamping tool 26 is shown that is to be inserted into the slots 17 in the projections 16 to pull the arms 15 toward the pipe 11 clamping the fitting tightly in place during setting of the dissolved plastic at the interfaces of the fitting and the pipe. The tool 26 includes a lever with a handle 27 with a T-shaped connector 28 extending therefrom. A coil spring or elasticized cord (or bungee) 29 connects the T-shaped connector 28 to a further connector 30. FIG. 4 illustrates use of the tool to mount the fitting 10 on the pipe 11. After the solvent is applied across the entire under surface of the fitting and on the pipe surface to be contacted, the pipe saddle 10 is placed on the pipe 11, the connector 30 is inserted into one of the slots 17. The T-shaped connector 28 is inserted into the remaining slot 17, with the handle 27 extending away from the pipe saddle 10 and the spring 29 passed behind the pipe 11. The handle 27 and the T-shaped connector 28 are pivoted clockwise in the slot 17 as indicated in FIG. 4, until the lever reaches a stable over-center position with respect to the spring 29. This brings the entire mounting section 13, including the arms 15 tightly into engagement with the pipe 11 and pulls the entire under surface of the fitting into very high pressure contact with the pipe 11. Because the mounting section is flexible, the mounting section conforms in shape, under the applied forces, to the exterior of the pipe 11 regardless of departure of the pipe surface from a purely cylindrical shape. Compression of the ring 23 pumps solvent into an area surrounding the opening through the fitting, trapped air escapes through the perforations 18, dissolved plastic and solvent ooze through the perforations 18, and the entire contacting surfaces of the two parts become unified. The tool 26 is maintained in position until the bonding of the fitting 10 to the pipe 11 is complete and the tool is then removed.

A hole saw 32 having an outside diameter slightly less than the I.D. of the opening in the stems of the fitting is used to open a hole into the main pipe 11. Such a saw, known in the art is illustrated in FIG. 2 and typically is mounted on a power drill. It has a centering point 33, saw teeth 34, and a shaft 35 to be received in the chuck of the drill 36. The saw retains the plug cut from the side of the pipe 11. After removal of the saw, and the tool 26, the interior of the collar 21 of the stem and the exterior of the end of the branch pipe 12 are coated with the solvent and joined.

Figure 5:
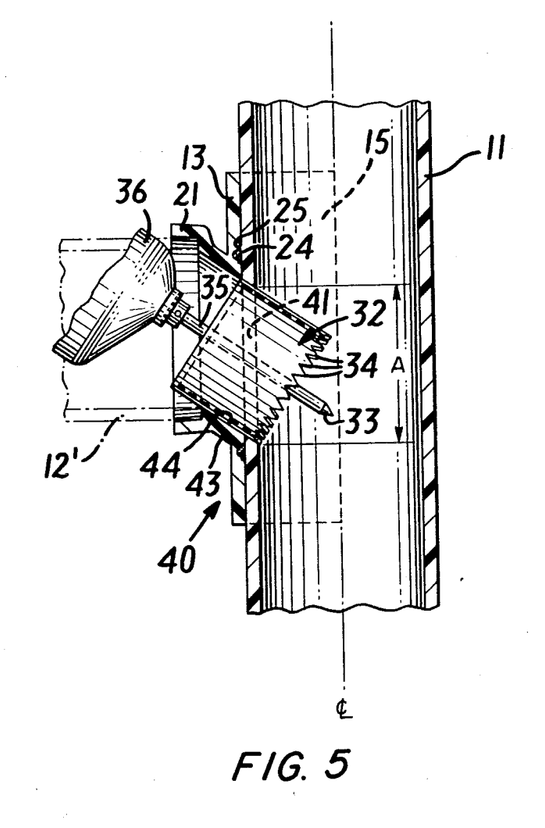
FIG. 5 is a cross-sectional view of another embodiment of a fitting and pipe in accordance with the invention with an enlarged effective flow area through the opening into the main pipe.
Figure 6:
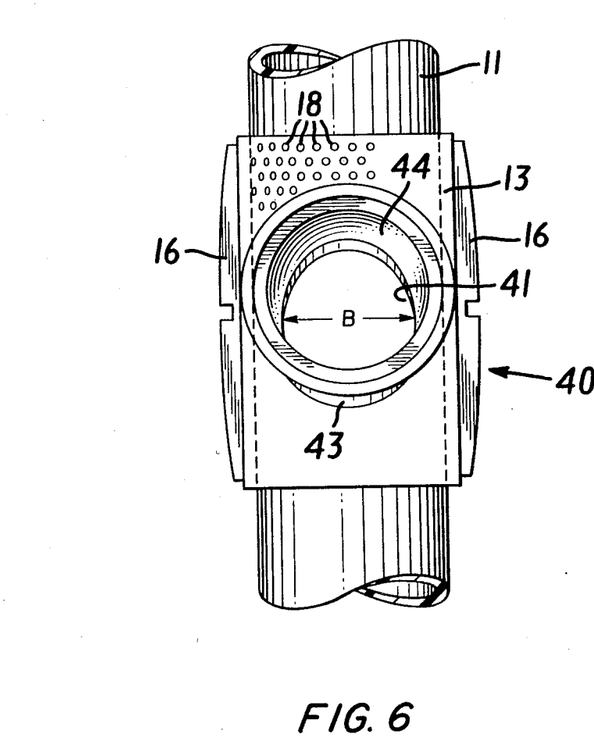
FIG. 6 is a front elevational view of the fitting and pipe shown in FIG. 5.
Figure 7:
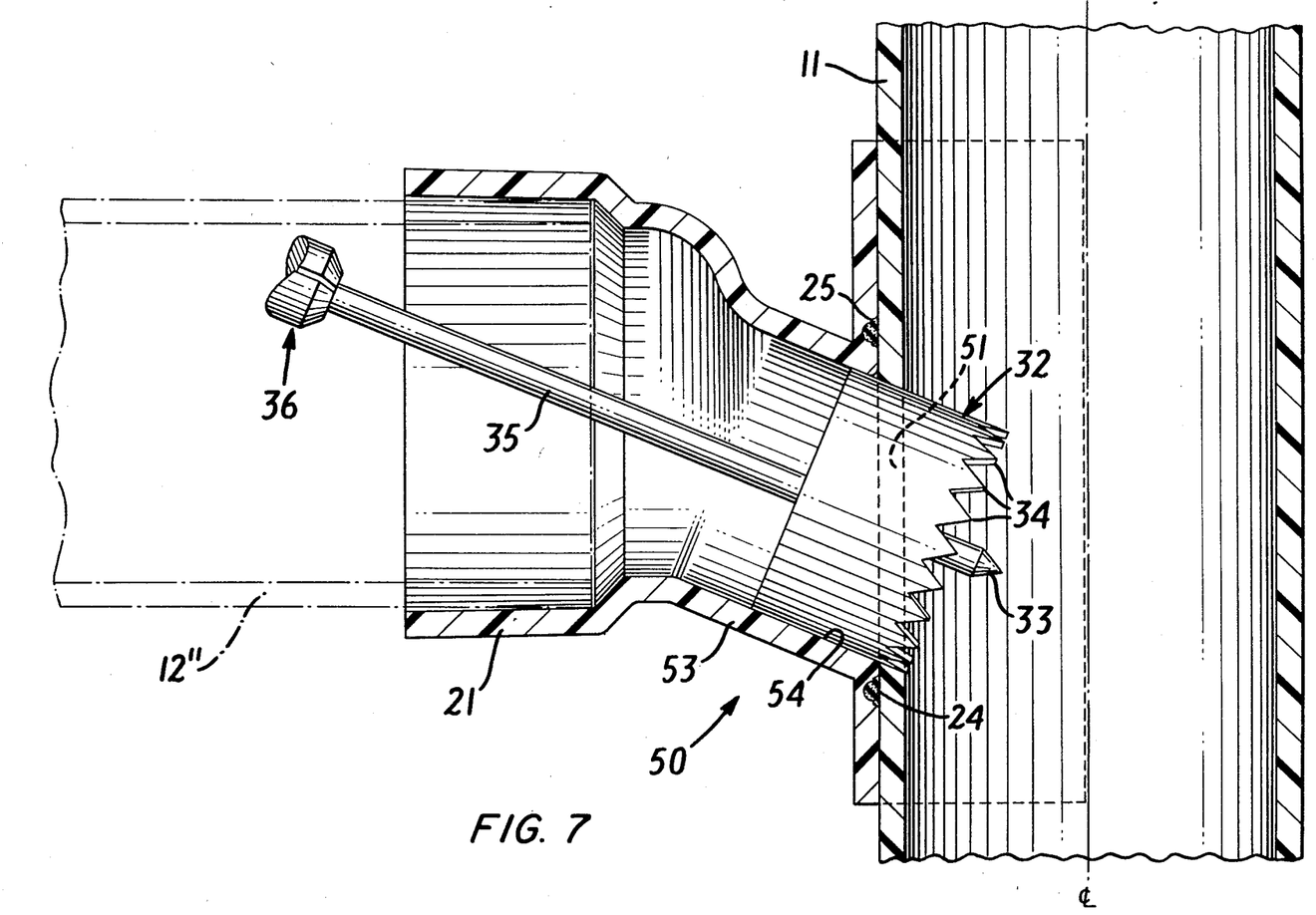
FIG. 7 is a cross-sectional view of yet another embodiment with a longer stem portion guiding a hole-cutting saw used to cut the main pipe.

In FIGS. 5, 6, and 7, embodiments of the invention are joining equal diameter main and branch pipes require some narrowing of the opening 41 through the branch pipe 11 to allow adequate surface contact between the fitting and the main pipe for good solvent bonding. The fitting of FIGS. 5 and 6 has a neck 43 inclined longitudinally, which is to say with respect to the axis of the main pipe 11. An internal cylindrical surface 44 of that neck offers guidance to the hole saw 41 after the fitting has been secured in place as described above. This results in the opening 41 into the main pipe being eliptical. Thus, the opening 41 has a longitudinal axis A greater than the reduced width B such that the necking-down or reduction in opening necessary to join the fitting to the main pipe 11 is minimized. The remaining features of the fitting are like those described above with respect to FIGS. 1–4 and include the saddle portion 13, with arms 15, the bosses 16, the holes or apertures 18, the ring 24 and its groove 25 forming the solvent pump, and the collar 21 that receives a branch pipe 12', indicated in phantom outline. Like conventional fittings for joining equal diameter sewage pipes, in particular, but requiring severing of the main pipe, the downward slope of the neck 43 facilitates the flow of liquid and solids from the branch pipe 12' into the main pipe 11. In conventional T-fittings, however, because a section of the main pipe is removed and the resultant ends slipped into collars, the inside diameter of the neck, where it slopes downward, can be equal to the inside diameter of the branch and main pipes without concern for adequate bonding.

In the fittings of FIGS. 5–7, care must be given to the provision of adequate guidance of the saw 34. In the fitting 40 of FIGS. 5 and 6, the side of the saw is brought initially into engagement with the upper portion of the interior surface 44 of the neck. The tip 33 enters the wall of of the main pipe 11 at the center of what will be the elliptical opening 41. The saw then is guided parallel the interior of the neck 43, and as the hole is cut the lower portion of the inside surface 44 increasingly assists in guidance of the path of movement of the saw into the main pipe.

In FIG. 7 a somewhat revised embodiment of the fitting of FIGS. 5 and 6 is shown at 50. This fitting includes a collar 21 for receiving the branch pipe 12" equal in diameter to the main pipe 11. A longer neck 53 increases an internal surface 54 providing greater guidance to the saw 41. The remainder of the fitting 50 is like the embodiments of FIGS. 1–6. In this fitting, the saw 41 is guided about its entire circumference as it begins to cut an eliptical opening 51 into the main pipe.

Thus, it will be seen that improved plastic fittings have been provided, eliminating severing of a plastic main pipe to join a branch pipe, while assuring extremely secure bonding between the fitting and the main pipe and that, furthermore, restriction between a branch and main pipes has been reduced without requiring severing of the main pipe. The fittings are easy to apply, even in restricted spaces and are unaffected by an extruded main pipe's departure from a purely cylindrical outer surface. While preferred embodiments have been described, it will be apparent to those skilled in the art that modifications may be made in the foregoing specific embodiments without departure from the spirit and scope of the invention as set out in the appended claims.

I claim:

1. In a plastic pipe fitting for joining a first plastic pipe to a second plastic pipe of a given diameter and including a mounting section to be secured by bonding to the exterior of the second pipe, a stem portion projecting from the mounting section and terminating in a collar for receiving an end of the first pipe, and a passage through the fitting defined by the collar, stem, and mounting section; the improvement comprising:

flexible arms on the mounting section diverging outwardly from the given diameter and of a length to extend partially around the second pipe;

means on the flexible arms for facilitating clamping of the mounting section with the arms flexed inward tightly into intimate engagement with the second pipe, said means for facilitating clamping being exteriorly accessible when said fitting is in place on the second pipe for bonding of engaging surfaces of the fitting and the second pipe;

means, on a pipe engagement surface of the mounting section and in encircling relation to the passage, for retaining solvent prior to application of the fitting to the second pipe, said means for retaining solvent including a groove formed in the pipe engagement surface; and means for emitting the retained solvent upon application of the fitting to the second pipe, said means for emitting the solvent including a compressible ring located in the groove end projecting beyond the surface for deformation upon application of the fitting of the second pipe, said groove having a portion thereof departing from the shape of the ring and opening to the surface to receive and hold solvent when the ring is relaxed, and the dimensions of said groove portion and said projecting portion of the ring being such that upon application of the fitting to the second pipe, the ring bulges into said groove portion to expel the retained solvent.

2. The fitting according to claim 1, wherein the entire mounting section is sufficiently flexible to conform to departure from the cylindrical of an extruded second pipe exterior surface.

3. The fitting according to claim 1, wherein the mounting section includes a less flexible central portion, said stem projecting from the central portion, and wherein a pipe engagement surface of the central portion, on the opposite side of the mounting section from the stem, has a curvature with a diameter substantially equal to the curvature of the surface of a second pipe of the given diameter.

4. The fitting according to claim 1, wherein said means for facilitating clamping includes projections on the arms for connecting temporarily to a clamping means extending from one arm to the other whereby the arms can be drawn tightly against the second pipe during hardening of a plastic bond therebetween.

5. The fitting according to claim 4, wherein the arms have a length to extend a maximum of approximately 180° around the second pipe of the given diameter, and said projections are proximate the ends of the arms.

6. The fitting according to claim 1 wherein the means for facilitating clamping comprise means for receiving connectors of a clamping tool, whereby the arms can be drawn down tightly against the second pipe during hardening of a plastic bond therebetween.

7. The fitting according to claim 6, wherein the means for receiving connectors of a clamping tool comprise slots opening substantially radially outward, and communicating openings rearward from the slots away from the mounting section, whereby the projection are adapted to receive T-shaped connectors.

8. The fitting according to claim 1, wherein the mounting section includes a plurality of air and solvent emission perforations therethrough defining means for the escape of air from between the mounting section and the second pipe and for the passage of solvent and dissolved plastic from between the mounting section and the second pipe.

9. The fitting according to claim 1, wherein the stem is inclined longitudinally of the location for the second pipe, and said passage defines an elliptical opening at a surface of the mounting section for contact with the second pipe, said elliptical opening being narrower than the inside diameter of the second pipe to which the fitting is adapted to connect said collar having an inside diameter sufficient to receive a first pipe equal in diameter to the second pipe.

10. The fitting of claim 1 in combination with a clamping tool having a first connector adapted to connect to one of the means for facilitating clamping on an arm of the fitting, an elongated elastic member secured to the first connector, a further connector adapted to connect to another of the means for facilitating clamping on another arm of the fitting and pivotal leverage means connected with the elastic member and adapted to pivot with respect to the second pipe, the fitting and the further connector to apply force between the arms and force together solvent coated surfaces of the second pipe and fitting.

11. In a plastic pipe fitting for joining a first plastic pipe to a second plastic pipe of a given diameter and including a mounting section to be secured by bonding to the exterior of the second pipe, a stem portion projecting from the mounting section and terminating in a collar for receiving an end of the first pipe, and a passage through the fitting defined by the collar, stem, and mounting section; the improvement comprising:

flexible arms on the mounting section diverging outwardly from the given diameter and of a length to extend partially around the second pipe; and means on the flexible arms for facilitating clamping of the mounting section including the arms tightly into intimate engagement with the second pipe; said means for facilitating clamping being exteriorly accessible when said fitting is in place on the second pipe for bonding of engaging surfaces of the fitting and the second pipe;

said means for facilitating clamping including projections on the arms for connecting to a clamping means extending from one arm to the other; the arms having a length to extend a maximum of approximately 180° around the second pipe of the given diameter and the projections being proximate the ends of the arms;

the mounting section including a plurality of air and solvent emission perforations therethrough defining means for the escape of air from between the mounting section and the second pipe and for the passage of solvent and dissolved plastic from between the mounting section and the second pipe; and a means for retaining solvent comprising a groove formed in a pipe engagement surface of the mounting section, and a means for emitting the retained solvent upon application of the fitting to the second pipe, comprising a compressible ring located in the groove and projecting beyond the surface for deformation upon application of the fitting to the second pipe, said groove having a portion thereof departing from the shape of the ring and opening to the surface to receive and hold solvent when the ring is relaxed, the dimensions of the groove portion and the projecting portion of the ring being such that upon application of the fitting to the second pipe, the ring bulges into said groove portion to expel the retained solvent.

* * * * *

UNITED STATES PATENT AND TRADEMARK OFFICE
CERTIFICATE OF CORRECTION

PATENT NO. : 4,606,558

DATED : Aug. 19, 1986

INVENTOR(S) : John H. C. Davidson

It is certified that error appears in the above-identified patent and that said Letters Patent is hereby corrected as shown below:

First page, 7th-from-bottom line in first column, "4,059,292" should read --4,059,291--;

Col. 1, line 28, "a ceiling" should read --or ceiling--;

Col. 7, line 46, "fitting of" should read --fitting to--.

Signed and Sealed this

Thirtieth Day of December, 1986

Attest:

DONALD J. QUIGG

*Attesting Officer*  *Commissioner of Patents and Trademarks*